United States Patent
Beardall et al.

(10) Patent No.: US 7,518,486 B1
(45) Date of Patent: Apr. 14, 2009

(54) METHOD FOR LOCKING AN ELECTRICAL DEVICE TO A GIVEN LOCALE

(75) Inventors: Gavin D. Beardall, Alresford (GB); Simon Rowland, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/098,935

(22) Filed: Apr. 7, 2008

(51) Int. Cl.
G08B 5/22 (2006.01)
H04Q 1/30 (2006.01)
G05B 19/00 (2006.01)

(52) U.S. Cl. .............. 340/7.23; 340/7.27; 340/5.5; 340/825.49; 235/375; 70/57; 70/277

(58) Field of Classification Search ......... 340/7.23, 340/7.27, 5.5, 568.1, 825.49, 825.34, 5.73; 235/375; 455/414.1, 41.2; 70/57, 277
See application file for complete search history.

(56) References Cited

U.S. PATENT DOCUMENTS

| | | | | |
|---|---|---|---|---|
| 4,791,409 | A | * | 12/1988 | Reid ............... 340/539.23 |
| 5,917,425 | A | * | 6/1999 | Crimmins et al. ...... 340/825.49 |
| 6,563,430 | B1 | * | 5/2003 | Kemink et al. ......... 340/825.49 |
| 6,850,252 | B1 | | 2/2005 | Hoffberg |
| 7,363,028 | B2 | * | 4/2008 | de Clerq et al. .......... 455/414.1 |
| 2008/0034224 | A1 | | 2/2008 | Ferren et al. |

FOREIGN PATENT DOCUMENTS

| | | |
|---|---|---|
| GB | 2393075 | 10/2002 |
| GB | 2389004 | 11/2003 |
| WO | WO0057378 | 9/2000 |
| WO | WO2005109363 | 11/2005 |

OTHER PUBLICATIONS

Power Line Communication, Wikipedia, Mar. 20, 2008, pp. 1-17, Wikipedia.org.
Home Automation, Wikipedia, Mar. 20, 2008, pp. 1-7, Wikipedia.org.

* cited by examiner

*Primary Examiner*—Brian Zimmerman
*Assistant Examiner*—Nam V Nguyen
(74) *Attorney, Agent, or Firm*—Suiter Swantz pc llo

(57) ABSTRACT

A method for locking an electrical device to a location includes installing a location code generating unit into a power network hub servicing a geographic area, generating a location code for the geographic area, at least periodically transmitting the generated location code substantially throughout the geographic area, further including, transmitting the location code substantially throughout the geographic area at a specific frequency, installing at least one frequency filter along at least one boundary of the geographic area for filtering the specific frequency at which the location code is transmitted to prevent transmission of the location code beyond a boundary of the geographic area, receiving the location code from the power network, prompting one or more electronic devices within the geographic area to input the location code, and locking the one or more electronic devices to the location via the location code.

1 Claim, 2 Drawing Sheets

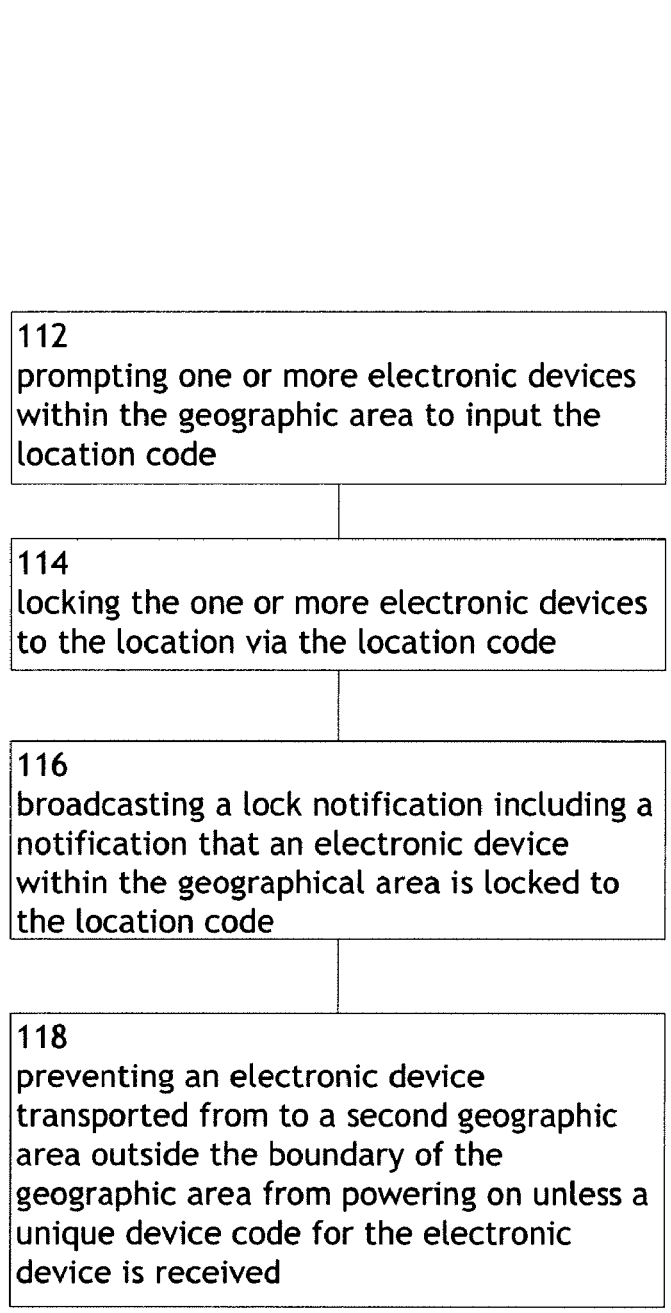

112
prompting one or more electronic devices within the geographic area to input the location code

114
locking the one or more electronic devices to the location via the location code

116
broadcasting a lock notification including a notification that an electronic device within the geographical area is locked to the location code

118
preventing an electronic device transported from to a second geographic area outside the boundary of the geographic area from powering on unless a unique device code for the electronic device is received

FIG. 1B

METHOD FOR LOCKING AN ELECTRICAL DEVICE TO A GIVEN LOCALE

TECHNICAL FIELD

The present disclosure generally relates to the field of electronic devices, and more particularly to a method of securing electronic devices.

BACKGROUND

Vehicles, homes, work places, factories, offices and other locations typically contain a large number of electrical items or electronic devices that are very appealing to thieves. For example, a car may contain a car radio, compact disc (CD) multi-changer, global positioning system (GPS) system, etc. A home is likely to contain a television (TV) set, digital video disc (DVD) player, computer, and numerous other electrical items. An office is likely to contain a large number of computers, and so on.

SUMMARY

A method for locking an electronic device to a location includes, but is not limited to: installing a location code generating unit into a power network hub servicing a geographic area; generating a location code for the geographic area; at least periodically transmitting the generated location code substantially throughout the geographic area, further including: transmitting the location code substantially throughout the geographic area at a specific frequency; installing at least one frequency filter along at least one boundary of the geographic area for filtering the specific frequency at which the location code is transmitted to prevent transmission of the location code beyond a boundary of the geographic area; receiving the location code from the power network; prompting one or more electronic devices within the geographic area to input the location code; locking the one or more electronic devices to the location via the location code; broadcasting a lock notification including a notification that an electronic device within the geographical area is locked to the location code; and preventing an electronic device transported from to a second geographic area outside the boundary of the geographic area from powering on unless a unique device code for the electronic device is received.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIGS. 1A and 1B are flow diagrams of a method for locking an electronic device to a specific location.

DETAILED DESCRIPTION

Figure 1A:
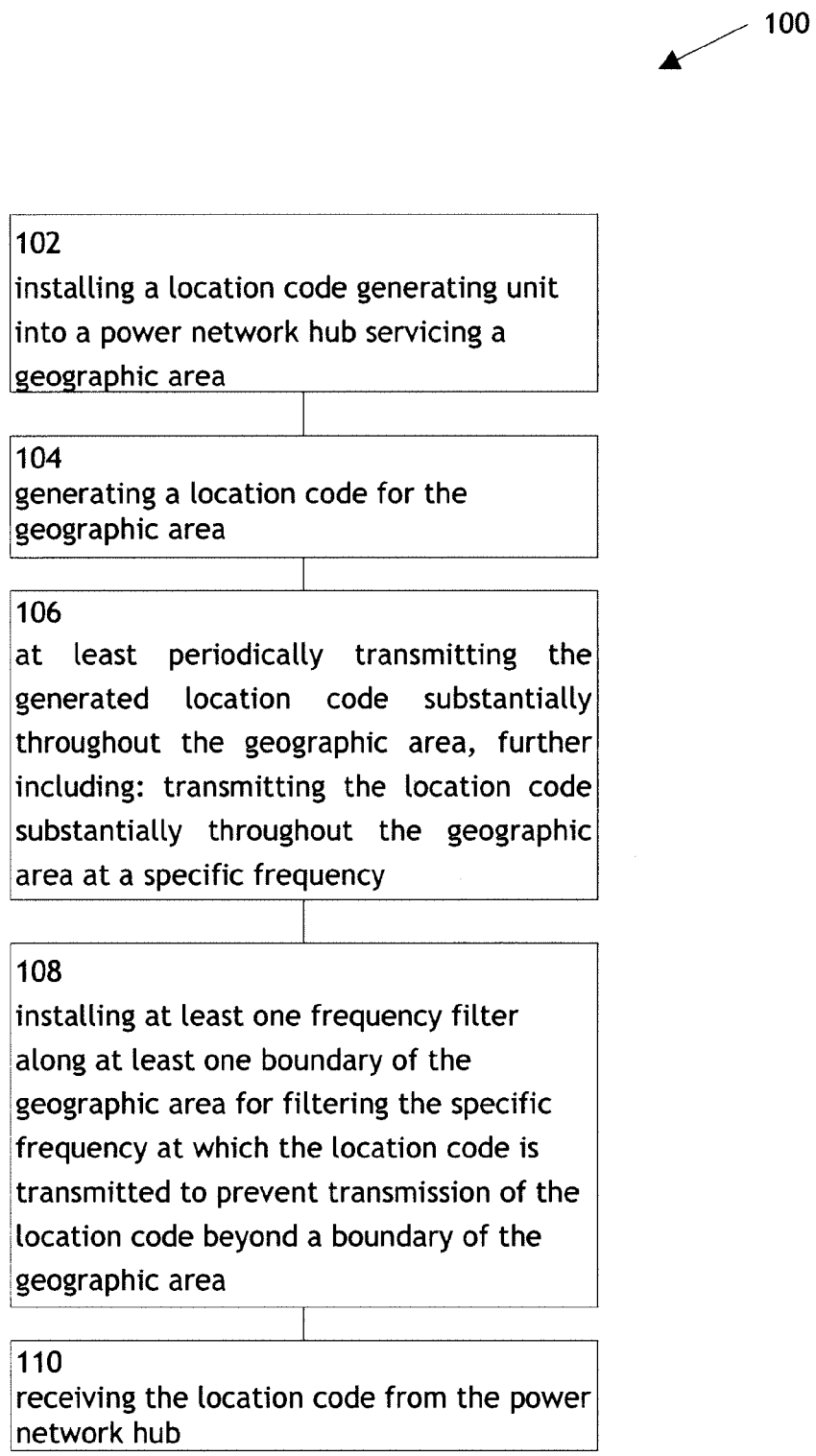

Reference will now be made in detail to the subject matter disclosed, which is illustrated in the accompanying drawings.

Referring to FIGS. 1A and 1B, flow diagrams of a method for locking an electronic device to a specific location are illustrated. Method 100 may include installing a location code generating unit into a power network hub servicing a geographic area 102 and generating a location code for the geographic area 104. The location at which an electronic device is deployed/utilized/located may be within a geographic area utilizing a shared central power provision or network including a power network hub. For example, a vehicle may include an approximately 12 V power rail running substantially about the perimeter of the vehicle, or a house, office or other building may include an approximately 240 V ring main providing power around the house or office. The power network may be utilized to transmit data as well as power. The power network of the location may be utilized to provide a small piece of data, such as a location code. Method may also include at least periodically transmitting the generated location code substantially throughout the geographic area, and may further include transmitting the location code substantially about the location at a specific frequency 106. Method 100 may also transmit the generated location code continuously or upon request. A power network hub for a location (geographic area) may transmit the unique location code substantially throughout the entirety of the service location of the power network, or throughout at least a portion of the power network.

Method 100 may also include installing at least one frequency filter along at least one boundary of the geographic area for filtering the specific frequency at which the location code is transmitted to prevent transmission of the location code beyond a boundary of the geographic area 108. Preferably, a filter may be installed along all boundaries of a location. Method may correlate the at least one filter with the frequency at which the location code is transmitted. The correlated filter installed along a location boundary may prevent the code leaking back into a wider power network. For instance, in a home location, the location boundary may be located at the point at which main electricity enters the house. In some instances, a location boundary may not be established, such as in a car, where the electrical system of the car is isolated to the car itself.

Method 100 may also include receiving a location code from the power network hub 110, and prompting one or more electronic devices to input the location code of the location 112. For instance, if a new device is in factory default mode, a prompt may be generated on the electronic device for the initial location code. The location code of the buyer's location may be input into the device, and the device may store the location code securely and utilize the location code during a startup check.

Method 100 may include locking the one or more electronic devices to the location via the location code 114. All or substantially all electronic devices at a location may be locked to the location via the same location code. The locked electronic device may function only at the location unless the electronic device is reprogrammed using an electronic device unique device code. The unique device code may be provided with the electronic device. For instance, an electronic device may verify the location code on startup/power up, and may prompt a user to enter the unique device code for the electronic device if an incorrect location code is received.

Method 100 may comprise broadcasting a lock notification including a notification that an electronic device within the geographical area is locked to the location code 116. For instance, a power network for a location may broadcast a notification that an electronic device within the geographical area is locked to the location code of the geographical area.

Method 100 may also include preventing an electronic device transported from to a second geographic area outside the boundary of the geographic area from powering on unless a unique device code for the electronic device is received 118. On moving the device to a new location, the device may fail to power up and prompt the user to enter the unique device code of the electronic device. The device code may be provided with the device, for example in the manual, or delivered electronically on registration of the device. The user may enter the electronic device unique device code, and may also be prompted to enter the location code for the location of the power network within which the electronic device is located.

Method 100 may include programming a location code generator for use with an electronic device. For instance, the location code generator may be programmed with the user, or may be bought preprogrammed with a unique location code. A user may transport the location code generator to a new location. For example, if a user moves to a new house, a user may transport the code generator to the new house. The user may not be required to reprogram an electronic device at the new location. In an alternative embodiment, method 100 may require a user to reprogram an electronic device utilizing the location code of the new location.

Method 100 may include implementing a waiting period between at least two attempts to enter an electronic device unique device code. An attempt to ascertain the device code during setup may be prevented by utilizing such a waiting period. The waiting period may increase proportional to the number of incorrect unique device codes that are input. Alternatively, the method 100 may limit a number of input attempts, after which the device may shut down permanently.

Method 100 may also include installing a decoder within an electronic device within an electronic device power supply. During a normal power up, the decoder may verify the received location code from the power network against a current location code stored on the electronic device. Start up may proceed if the location code is verified as correct, or may abort if the location code is determined to be incorrect. Method 100 may include reprompting an electronic device for a unique device code when a location code is determined to be incorrect, as per the reprogramming step above.

Method 100 may further include providing a displayable notification (e.g., a sign or sticker) for an electronic device. Providing a displayable notification for an electronic device may include placing the displayable notification on the electronic device, or within the immediate location of the electronic device.

Method 100 may also include fitting at least one electric choke along a boundary of the location. For example, a house system or an office building system may fit an electric choke before the point at which the master power cable enters the house. Fitting at least one electric choke along the boundary of the location may prevent the unique device code of an electronic device from being broadcast outside the location. Therefore, the electrical choke may prevent an additional or unauthorized user on a nearby power networks from acquiring the unique device code. Any type of electric choke may be utilized. In some instances, an electric choke may not be utilized. For example, a car or other such electrically isolated unite may not require a choke. In other instances, multiple chokes may be utilized in one location. For example, a factory or other such building or campus may select a different code for individual areas within the structure or perimeter to add additional security to the electronic devices and prevent unauthorized movement of electronic devices between different code areas.

Method 100 may include constructing a location management system utilizing two way data transmission. An electronic device attached to the power network may broadcast a unique identifier and electronic device details. Utilizing the unique identifier and details, a system such as a home automation system may enumerate the electronic device(s) attached to the power network and control and/or interrogate the electronic device(s).

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

In a general sense, those skilled in the art will recognize that the various aspects described herein can be implemented, individually and/or collectively, by a wide range of hardware, software, firmware, and/or any combination thereof and can be viewed as being composed of various types of "electrical circuitry" or "logic." Those having skill in the art will recognize that the subject matter described herein may be implemented in an analog or digital fashion or some combination thereof.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for locking an electronic device to a location comprising:

installing a location code generating unit into a power network hub servicing a geographic area;

generating a location code for the geographic area;

at least periodically transmitting the generated location code substantially throughout the geographic area, further including:

transmitting the location code substantially throughout the geographic area at a specific frequency;

installing at least one frequency filter along at least one boundary of the geographic area for filtering the specific frequency at which the location code is transmitted to prevent transmission of the location code beyond a boundary of the geographic area;

receiving the location code from the power network hub;

prompting one or more electronic devices within the geographic area to input the location code;

locking the one or more electronic devices to the location via the location code;

broadcasting a lock notification including a notification that an electronic device within the geographical area is locked to the location code;

preventing an electronic device transported from to a second geographic area outside the boundary of the geographic area from powering on unless a unique device code for the electronic device is received;

programming a location code generator for use with the electronic device;

implementing a waiting period between at least two attempts to enter an electronic device unique device code, the waiting period increasing proportional to the number of incorrect unique device codes that are input;

installing a decoder within an electronic device within an electronic device power supply;

providing a displayable notification for an electronic device;

fitting at least one electric choke along a boundary of the location; and constructing a location management system utilizing two way data transmission, further including:

utilizing an electronic device attached to the power network may broadcast a unique identifier and electronic device details of an electronic device to enumerate the electronic device and control or interrogate the electronic device.

* * * * *